US009121173B2

(12) United States Patent
Hudson

(10) Patent No.: US 9,121,173 B2
(45) Date of Patent: Sep. 1, 2015

(54) SYSTEM AND METHOD FOR CONSTRUCTION MODELING

(76) Inventor: Harold C. Hudson, Mason City, IA (US)

( * ) Notice: Subject to any disclaimer, the term of this patent is extended or adjusted under 35 U.S.C. 154(b) by 0 days.

(21) Appl. No.: 13/572,807

(22) Filed: Aug. 13, 2012

(65) Prior Publication Data

US 2013/0045466 A1    Feb. 21, 2013

Related U.S. Application Data

(60) Provisional application No. 61/524,419, filed on Aug. 17, 2011.

(51) Int. Cl.
| E04B 2/74 | (2006.01) |
| E04B 2/72 | (2006.01) |
| E04B 2/00 | (2006.01) |
| G09B 25/02 | (2006.01) |

(52) U.S. Cl.
CPC ... *E04B 2/74* (2013.01); *E04B 2/00* (2013.01); *E04B 2/72* (2013.01); *G09B 25/02* (2013.01)

(58) Field of Classification Search
CPC .................................. E04B 2/00; E04B 2/74
USPC .............................. 434/75; 52/238.1; 160/181
See application file for complete search history.

(56) References Cited

U.S. PATENT DOCUMENTS

| 850,662 | A | * | 4/1907 | Lorenz | 248/235 |
| 2,390,751 | A | * | 12/1945 | Tinnerman | 402/22 |
| 3,934,382 | A | * | 1/1976 | Gartung | 52/144 |
| 4,603,531 | A | * | 8/1986 | Nash | 52/793.1 |
| 5,572,841 | A | * | 11/1996 | Buster | 52/270 |
| 5,743,056 | A | * | 4/1998 | Balla-Goddard et al. | 52/309.11 |
| 5,875,596 | A | * | 3/1999 | Muller | 52/239 |
| 6,298,619 | B1 | * | 10/2001 | Davie | 52/293.3 |
| 6,974,324 | B1 | * | 12/2005 | Gregoire et al. | 434/72 |
| 7,958,683 | B2 | * | 6/2011 | Abusada et al. | 52/239 |
| 2005/0230578 | A1 | * | 10/2005 | Stockton | 248/217.3 |
| 2009/0193750 | A1 | * | 8/2009 | Klima | 52/712 |

* cited by examiner

*Primary Examiner* — Sam Yao
*Assistant Examiner* — Jennifer L Fassett
(74) *Attorney, Agent, or Firm* — Zarley Law Firm, P.L.C.

(57) ABSTRACT

A wall forming system for modeling office space having a plurality of panels having a first sheet and a second sheet in parallel spaced alignment separated by a support sheet. The system also includes a plurality of support members having a first sidewall and a second sidewall in parallel spaced relation separated by a transverse wall. The system also includes a plurality of connecting members having a first sidewall and a second sidewall in parallel spaced relation separated by a transverse wall. The support members connect to and provide support to the panels. The connecting members also connect to the panels as well as connect to adjacent support members and connecting members thereby providing a wall forming system that is convenient and easy to use.

19 Claims, 5 Drawing Sheets

SYSTEM AND METHOD FOR CONSTRUCTION MODELING

CROSS REFERENCE TO RELATED APPLICATION

This application claims the benefit of U.S. Provisional Application No. 61/524,419 filed Aug. 17, 2011.

BACKGROUND OF THE INVENTION

This invention relates to construction. More specifically and without limitation this invention relates to a method and system of constructing modeling office space.

When new office buildings, manufacturing facilities, hospitals, or the like are being designed architects or those designing the buildings desire to mockup or provide a replica or model of what the space will look like before building occurs. This process is proven to allow problem solving and elimination of process waste in a rapid improvement environment. Metrics are predetermined and event success is determined by how many metrics have been met. For example, by constructing different floors or layouts of potential cubicles, offices, and the like architects can see how work flow will actually exist once the building is constructed. In manufacturing, hospital, and office settings this can be crucial to the job that must be undertaken in the office space. By pre-constructing the space before actually constructing the building, floor, or the like allows the architect to make changes before they become a problem and are permanent features in a building. Once they become permanent features not only does a problem area occur that hurts work flow, but additionally correction to such flawed areas is expensive.

Currently these types of mockups or modeling are done by utilizing typical construction materials such as wood frame and drywall or Masonite in combination with nails, screws and other similar fasteners. Thus, in order to construct such a test site teams of individuals must be used with equipment brought in and construction times can take weeks. In addition, safety concerns are presented because of the use of power tools, including the cutting of wood, and additionally because of the lifting and moving of and setting the finished panels in place. In addition, mock furniture and fixtures are typically fabricated from foam and after the entire model is constructed a large amount of waste including panel material, wood scraps, foam, and the like cannot be reused and are simply wasted.

Thus, a need in the art exists for a system and method that is efficient and minimizes the time required to set up such mockup or modeled areas. In addition, a need in the art exists to reduce required man hours, safety risks, waste and other disadvantages associated the mockup process.

Thus, a principal object of the present invention is to provide a method and system of constructing a building floor model that is time efficient.

Yet another object of the present invention is to provide a method and system of making a building floor model that is both inexpensive and safe for workers.

DESCRIPTION OF THE PREFERRED EMBODIMENT

Figure 1:
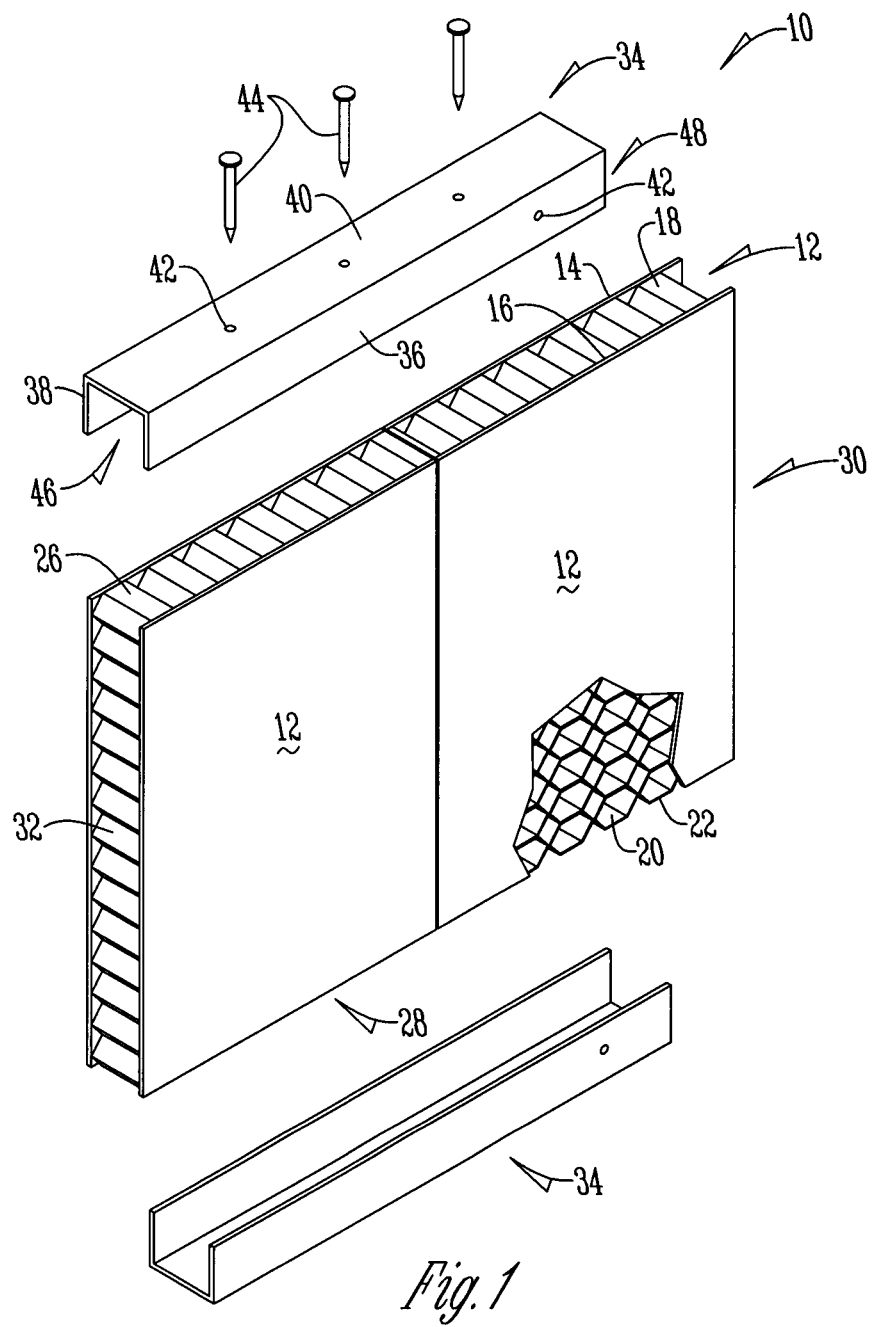
FIG. 1 is a perspective exploded view of a panel and a first supporting member.

The Figures show a wall system 10 that utilizes a panel 12 having a first sheet 14 and second sheet 16 in spaced apart relation with a support sheet 18 disposed therebetween. The support sheet 18 presents a plurality of compartments 20 that in a preferred embodiment are square or diamond shaped wherein each of the compartments 20 are interlocked with one another preferably in a honeycomb arrangement or webbing arrangement as shown in the figures. Thus, each compartment 20 has a perimeter 22 surrounding an open pocket that is covered by the first sheet 14 and second sheet 16. In a preferred arrangement the first sheet 14 and second sheet 16 are in parallel space alignment and connect on either side or end of the perimeter in perpendicular sealing alignment to form a plurality of closed and sealed cells or compartments 20 within panel 12. Specifically, in a preferred embodiment the panels are cardboard with a honeycomb interior. Preferably each panel 12 is square or rectangular in shape with a top edge 26, a bottom edge 28, a right edge 30 and a left edge 32.

A plurality of supporting members 34 are slidably received by an edge 26, 28, 30, 32 of the panels 12. As best shown in the figures the supporting member 34 has a generally U-shaped body or channel with a first sidewall 36 and second sidewall 38 spaced in parallel relation and connected with a center transverse wall 40 disposed therebetween. The transverse wall 40 contains a plurality of openings 42 that receive fastening devices 44 such as nails such that the supporting member 34 can be secured to the panel 12. Openings 42 are also positioned in sidewalls 36 and 38 to allow for the insertion of fastening devices 44 across the width of the panel 12. The supporting member 34 terminates in opposing first open end 46 and second open end 48 such that it may be slidably received by the panel 12 in any location and specifically in the middle of the panel 12.

Specifically, when supporting member 34 is in place on panel 12, the channel-shaped support member 34 is fully engaged over the panel 12. In this position the inside surface of traverse wall 40 engages an edge 26, 28, 30, 32 of panel 12. In this position, if the edge 26, 28, 30, 32 is open, the exterior edge of support sheet 18 engages the inside surface of traverse wall 40. Also, in this position, the exterior edge 26, 28, 30, 32 first sheet 14 and second sheet 16 also engage the inside surface of traverse wall 40. Also, in this position, the first sidewall 36 frictionally engages the first sheet 14 in parallel spaced alignment, and the second sidewall 38 frictionally engages the second sheet 16 in parallel spaced alignment. In this manner the supporting member 34 is a stabilizing structure such that the panel 12 may be positioned in the supporting member 34. In this way, the supporting member 34 provides additional rigidity and strength to the panel 12 which allows the panel to stand-up straight and be more durable. In addition the addition of the supporting member 34 to the panel 12 provides an aesthetically pleasing finished and professional appearance.

The wall system also includes connecting members 50. Connecting members 50 are similar to the supporting member 34 in that they similarly supports a panel 12. However, connecting members 50 provide the additional functionality of connecting panels 12 in side-by-side, end-to-end, or adjacent manner.

Figure 2:
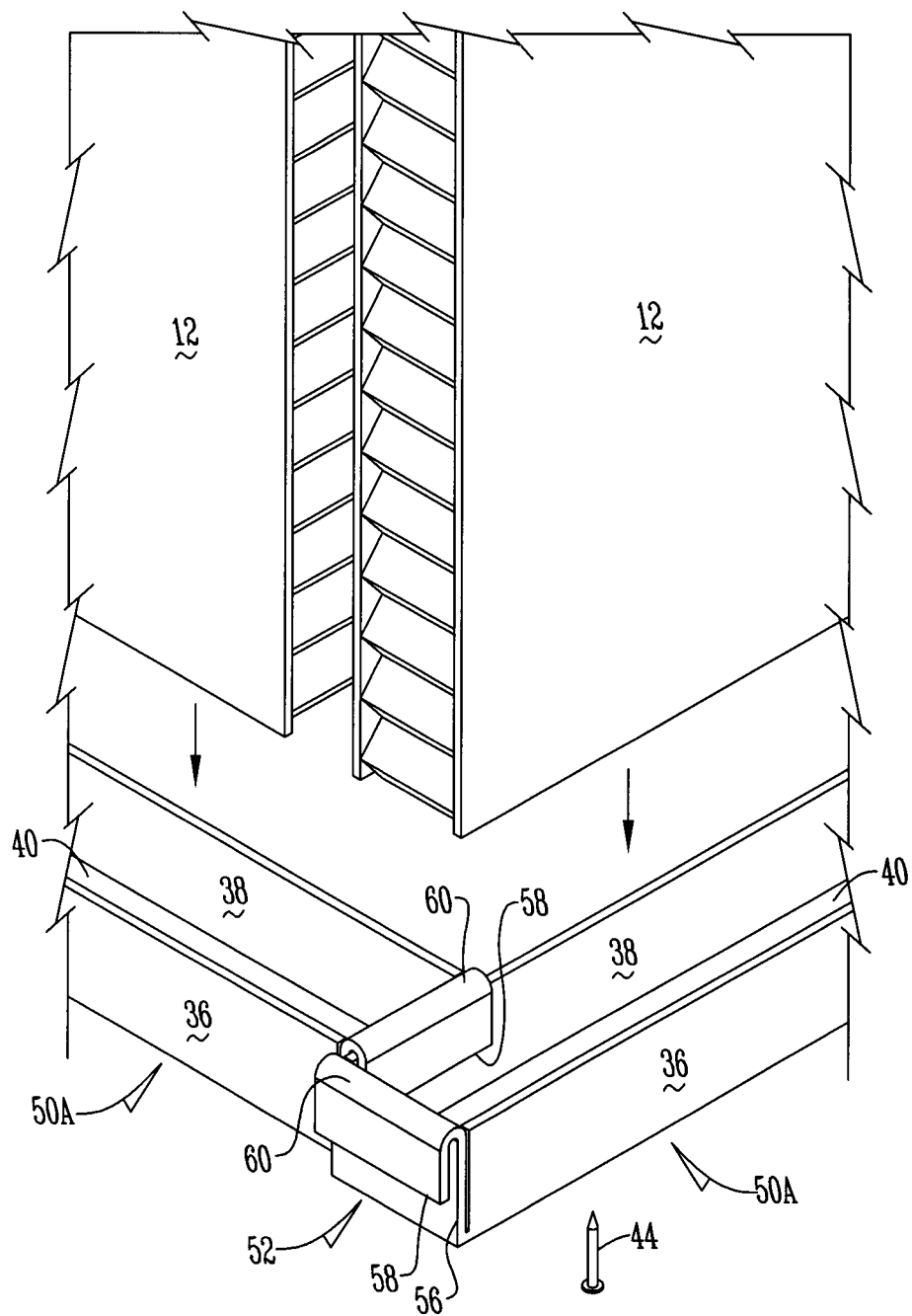
FIG. 2 is a perspective exploded view of a second type of connecting member.

With reference to FIG. 2, a first type of connecting member 50A is presented. The first type of connecting member 50A, like support member 34 includes a generally U-shaped body or channel with a first sidewall 36 and second sidewall 38 spaced in parallel relation and connected with a center transverse wall 40 disposed therebetween. The transverse wall 40 contains a plurality of openings 42 that receive fastening devices 44 such as nails such that the connecting member 50A can be secured to the panel 12. Unlike support member 34, the first type of connecting member 50A additionally has a flange 52 positioned at first end 46 and second end 48. Flange 52 extends between the first sidewall 36 and second sidewall 38 and is folded on top of itself in U-shape fashion to create a first clip portion 56 and second clip portion 58 connected to one another by a seam or fold-line 60. Preferably, flange 52 connects at each opposing end 46, 48 of transverse wall 40 and folds down to cover and close the U-shaped channel between first sidewall 36 and second sidewall 38. In this way, flange 52 extends perpendicular to transverse wall 40. In this way, flange 52 also extends perpendicular to sidewalls 36, 38.

First clip portion 56 and second clip portion 58 are positioned in overlapping condition with a space therebetween that is sized and shaped to frictionally and fittingly receive and engage a sidewall 36, 38 of another member 34, 50 so as to hold the two members together. The elasticity of the first clip portion 56 and second clip portion 58 are such that they bias toward one another. In this manner the flange 52 may be secured to a first sidewall 36 or second sidewall 38 of any supporting member 34 or connecting member 50 to provide panels 12 standing adjacent and perpendicular to one another at a joint. Alternatively two flanges 52 of adjoined connecting members can be secured to one another to align two panels in side by side fashion. In this arrangement the panels 12 are secured to the connecting or supporting members and do not move relative to one another.

To accomplish proper fitting, seam 60 is positioned past the edge of sidewall 36, 38 so that the space between first clip portion 56 and second clip portion 58 can receive the entire sidewall 36, 38 so as to maintain the two members 34, 50 in parallel alignment, preferably with the transverse walls 40 parallel with one another and in the same plane.

Figure 3:
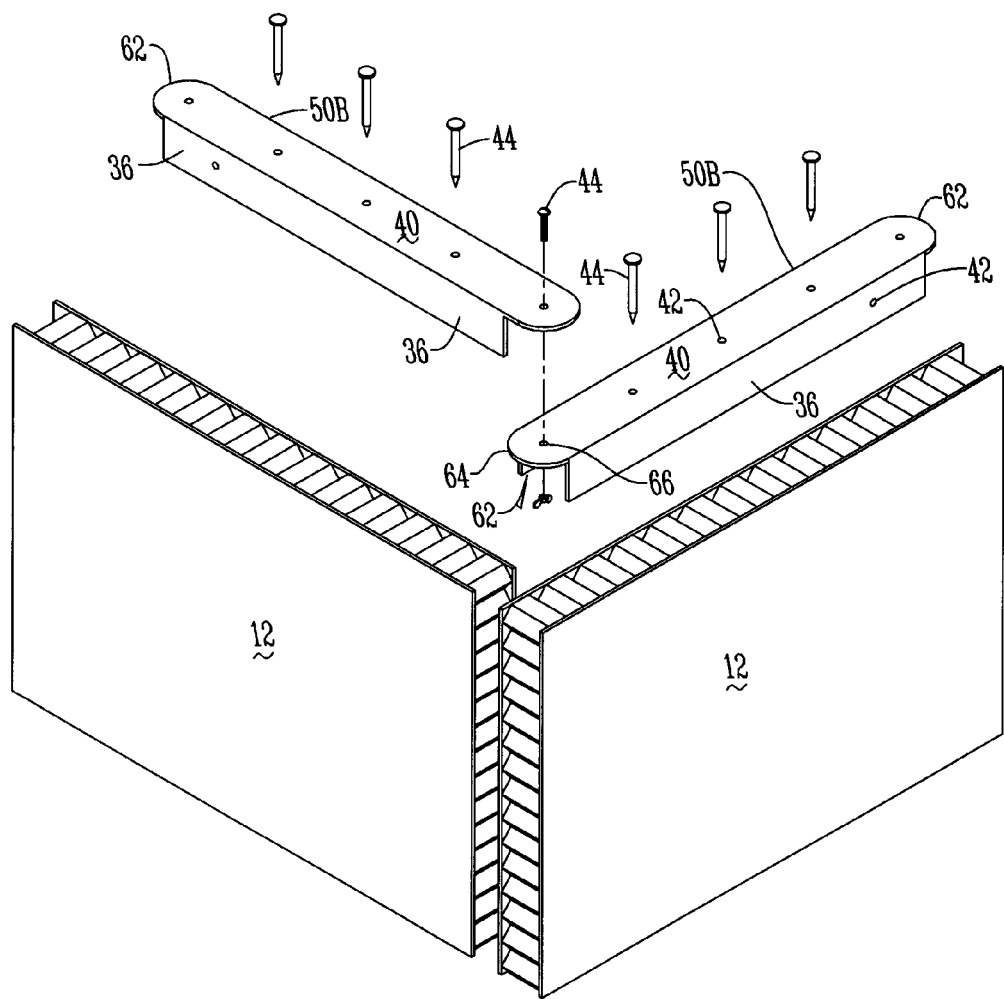
FIG. 3 is a perspective exploded view of a third type of connecting member.

With reference to FIG. 3, a second type of connecting member 50B is like the first type of connecting member 50A with the difference being the second type of connecting member 50B has tabs 62 connected to the end 46, 48 of transverse wall 40. Tabs 62 extend past the ends 44, 46 of the first sidewall 36 and second sidewall 38. Preferably tab 62 extends perpendicular to first sidewall 36 and second sidewall 38. Preferably tab 62 extends in parallel alignment and in the same plane as transverse wall 40. Also, when viewed from above or below transverse wall 40, preferably tab 62 terminates in a rounded and preferably semi-circular exterior edge 64. An opening 66 is disposed through the tab 62 such that a fastener 44 such as a screw with an accompanying wing nut can be disposed through the opening 66. In this manner another second type of connecting member 50B can be rotatable connected by disposing the passing the fastener 44 through the openings 66 in each of overlapping tabs 62 thus providing a pivot axis about the fastener 44 or screw so that panels may pivot as needed about the pivot axis. The rounded and/or semi-circular shape of tab 62 serves to allow for this pivoting arrangement and further allows for two panels to be positioned at any angle from straight (180 degrees) to a hyper acute angle (~0 degrees) to one another.

Figure 4:
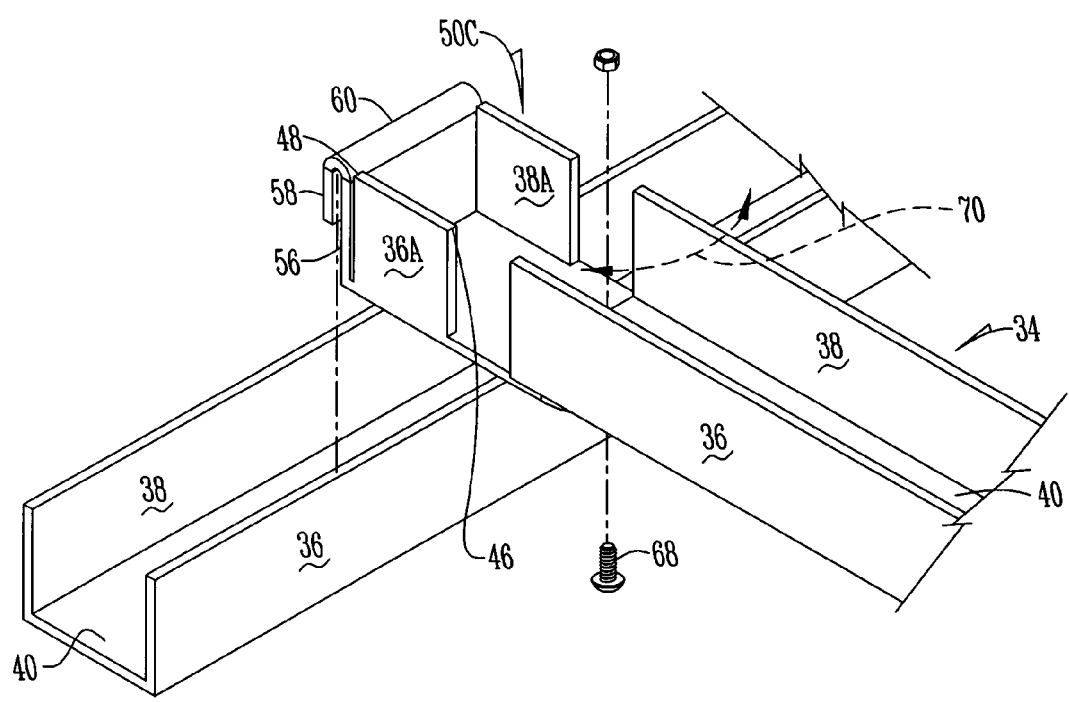
FIG. 4 is a perspective exploded view of a fourth type of connecting member.

With reference to FIG. 4, a third type of connecting member 50C has first clip portion 56, second clip portion 58 and fold line 60 connected at the end of a transverse center wall 40 and extending downwardly therefrom, similar or identical to that described with respect to the first type of connecting member 50A. Also, extending downwardly from the center wall 40 are opposing sidewalls 36A, 38A, similar to other sidewalls 36, 38 described with respect to other components of this system 34, 50A and 50B. However, the sidewalls 36A, 38A in this embodiment only extend laterally the length equivalent to the interior distance between sidewalls 36, 38 of other components of the system 34, 50A and 50B. This is so that the sidewalls 36A, 38A of this third type of connecting member 50C can be inserted in-between the sidewalls 36, 38 of other components of the system 34, 50A, 50B so as to hold the two members together in mating arrangement. The center transverse wall 40 of this third type of connecting member 50C extends past the ends of the sidewalls 36A, 38A and away from first clip portion 56, second clip portion 58 and fold line 60. Positioned in this extension of center transverse wall 40 is a through hole which connects to axle 68 which also passes through a through hole in the center transverse wall 40 of a support member 34 adjacent its end 46, 48. Preferably, this extension of center transverse wall 40 is positioned on top of the center wall 40 of support member 34, on the side opposite sidewalls 36, 38. Axle 68 and this positioning allows third type of connecting member 50C to angularly adjust along arrow 70 relative to the support member 34 to which it is attached. The first clip portion 56, second clip portion 58 and fold line 60 of third type of connection member 50C allows for connection to the sidewall 36, 38 of other members of thesystem 34, 50A, 50B, 50C. Also, because a gap is positioned between the ends 46, 48 of sidewalls 36A, 38A of the third type of connecting member 50C, the sidewalls 36A, 38A of the third type of connecting member can be slid within the sidewalls 36, 38 of other members of the system 34, 50A, 50B, 50C thereby connecting the two members together.

Figure 5:
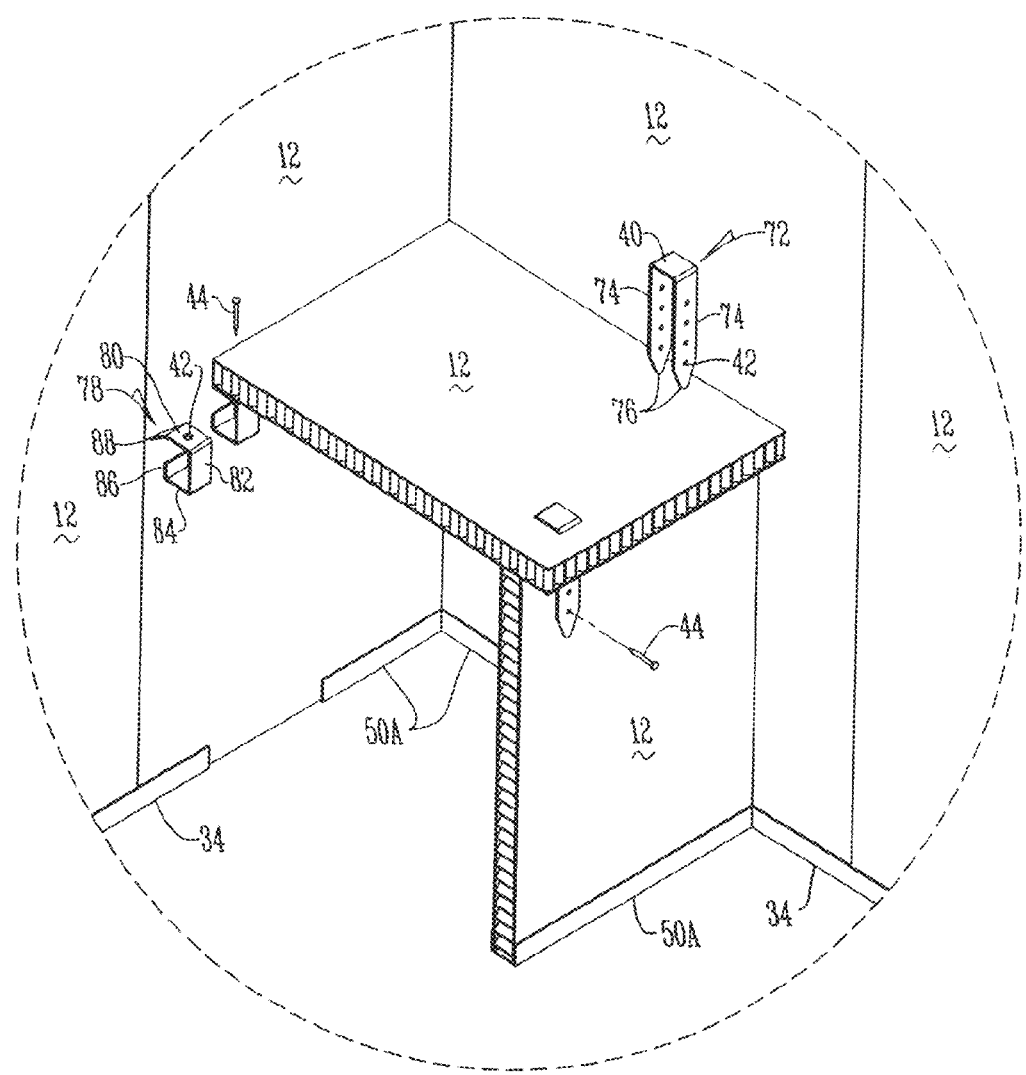
FIG. 5 is a perspective view of a wall forming system.

With reference to FIG. 5 a perpendicular support 72 is presented. Perpendicular support 72 is sized and be inserted through a the plane of a perpendicular panel 12 and fit over an edge 26, 28, 30, 32 of another panel 12 which is positioned parallel to the perpendicular support 72. In this way, perpendicular support 72 connects two perpendicular panels 12, so as to form a desktop or similar structure. Perpendicular support 72 has a center transverse wall 40 connected at each end to elongated supports 74 which extend perpendicular to center transverse wall 40 and terminate in a sharp point 76 which assists with inserting the perpendicular support through panel 12. The center transverse wall 40 and elongated supports 74 of perpendicular support 72 contain at least one and preferably a plurality of openings 42 which receive fastening devices 44. When perpendicular support 72 connects two perpendicular panels 12 together, the center transverse wall 40 is laid in flush parallel contact with the surface of the first panel 12, while the elongated supports 74 extend down the sides of second panel 12 in parallel contact.

Also shown in FIG. 5 is wall cleat 78. Wall cleat 78 connects to the surface of a vertically standing panel 12 and supports a perpendicular panel 12. Wall cleat 78 has a flat and flush top wall 80 which is connected to a downwardly extending wall 82 which connects to a bottom wall 84 which extends towards panel 12 and connects to a flush engagement member 86. Flush engagement member 86 engages and extends parallel to the surface of panel 12 so as to provide adequate surface area engagement to support the panel 12 placed on top of wall cleat 78. An insertion member 88, which is inserted into panel 12 to which wall cleat 78 is connected, is attached to each of the top wall and the flush engagement member 86 so as to hold the wall cleat 78 onto and into panel 12. In an alternative arrangement, as is shown in FIG. 5, the insertion member 88 does not attach to the flush engagement member 86. Preferably, insertion member 88 is pointed. Preferably wall cleat 78 contain at least one and preferably a plurality of openings 42 which receive fastening devices 44 which also pass through panel 12 and connect it thereto.

The system 10 includes a corner-joint. The corner-joint is formed of two supporting members 34, as are described herein, connected to one another at 90 degrees. More specifically, to form a corner-joint for positioning two panels at a 90 degree angle to one another, two supporting members 34 are aligned with one another along their length with the center transverse wall 40 of the first supporting member being attached to and along the length of one of the sidewalls 36, 38, of the second supporting member 34. The center transverse wall 40 of the first supporting member is connected to the sidewall 36, 38 of the second supporting member 34 by any means known in the art such as welding, gluing, bolting, adhesive, riveting, or the like or alternatively the corner-joint is made of a single continuous piece of material. In this arrangement, the ends 46, 48 of the two supporting members 34 are also aligned with one another. The corner-joint provides a convenient and secure device for forming a 90 degree join for two panels.

Similarly, a three-way corner-joint can be formed by attaching the center transverse wall 40 of a third supporting member 34 to the other or opposing sidewall 34, 36 of the second supporting member 34 to hold three panels 12 at 90 degrees to one another. In this arrangement the first and third supporting members are aligned at 180 degrees from one another.

Similarly a four-way corner joint can be formed by attaching the center transverse wall 40 of a fourth supporting member 34 to the center transverse wall 40 of the second supporting member 34. The resulting four-way corner joint holds four panels at 90 degrees to one another. Alternatively any number of supporting members 34 can be connected to one another at any angle to produce angled corner-joints.

In operation, panels 12 are slid into supporting members 34 and connecting members 50. Then where corner joints are needed the first type of connecting members 50A are utilized and connected to other supporting members 34 and connecting members 50 as is needed. When a movable panel 12 needs to be presented the second type of connecting member 50B is used wherein the fastener 44 or screw with wing nut is disposed through adjacent second types of connecting members 50B having panels 12 slid therein to provide a panel 12 that can be rotated about the pivot axis.

The connecting members 50 and supporting members 34 are easily attached to the panels 12 with fastening devices such as nails that can easily be inserted through the panels. This is because the panels 12 are generally of light construction, such as card board. Specifically, because of the honeycomb shaped interior cavities 20 having the open pockets 24 of only air a nail 44 can be pushed in the panel 12 using merely force created by an individual pushing on the nail 44. No exterior devices such as hammers, drills, or the like are thus needed in order to connect the connecting members 50 and supporting members 34 to the panels 12.

At the same time because of the honeycomb shape, material and pockets disposed within the panel 12, the panel 12, while extremely light, is of sufficient strength to stand and create a solid wall that is not easily moved or broken. In addition, because the panel 12 is made of materials such as card board, the panels 12 can be cut to size with simple hand tools, such as a pocket knife or box cutter. Thus, a single individual merely using the strength to push a nail through the panel, and a conventional knife can assemble an entire model floor layout without having to construct wood frames, cut drywall, carry heavy drywall and frames and the like, eliminating the need for power tools or strenuous activities that can injure workers. Additionally, a single worker can quickly put together mockups saving significant time and man hours. Further, minimal, if any, waste results from using the panels 12 and the panels 12 can additionally be reused over and over thus minimizing the amount of waste created in creating a floor plan. Thus, at the very least all of the stated objectives have been met.

It will be appreciated by those skilled in the art that other various modifications could be made to the device without parting from the spirit and scope of this invention. All such modifications and changes fall within the scope of the claims and are intended to be covered thereby.

What is claimed:

1. A wall forming kit for modeling office space, the kit comprising:
   a plurality of support members wherein each support member has a U-shaped body that extends a length between opposing ends, the U-shaped body including a first sidewall and a second sidewall in parallel spaced relation separated by a transverse wall, the U-shaped body having a plurality of openings therein, wherein the ends of the U-shaped body are open;
   a plurality of connecting members wherein each connecting member has a U-shaped body that extends a length between opposing ends, the U-shaped body including a first sidewall and a second sidewall in parallel spaced relation separated by a transverse wall, the U-shaped body having a plurality of openings therein;
   the plurality of connecting members wherein each connecting member has a flange positioned adjacent one end of the U-shaped body or a first flange positioned at one end of the U- shaped body and a second flange positioned at the other end of the U-shaped body, wherein the at least one flange is sized and shaped to fit over and frictionally engage and hold the sidewall of one of the support members or another connecting member;
   a plurality of perpendicular supports wherein each perpendicular support has a center transverse wall connected to a pair of elongated supports, wherein the elongated supports extend in parallel spaced relation to one another, terminate in a point opposite the center transverse wall, and have a plurality of openings;
   a plurality of wall cleats wherein each wall cleat has a flat top wall and a pointed engagement member;
   wherein the kit is used to model office space.

2. The wall forming kit of claim 1 further comprising a plurality of fasteners, wherein each fasteners is sized and shaped to pass through the plurality of openings in the plurality of support members and the plurality of connecting members.

3. The wall forming kit of claim 1 further comprising a plurality of panels, wherein each panels is formed of cardboard.

4. The wall forming kit of claim 1 further comprising a plurality of panels, wherein each panel has a first sheet and a second sheet in parallel spaced relation separated by a support sheet positioned there between.

5. The wall forming kit of claim 1 wherein each flange of the plurality of connecting members has a first clip portion and a second clip portion connected by a fold-line.

6. The wall forming kit of claim 1 wherein each flange of the plurality of connecting members is connected to the transverse wall by an axle such that the flange is angularly adjustable with respect to the length of the connecting member.

7. The wall forming kit of claim 1 further comprising a knife.

8. The wall forming kit of claim 1 wherein each flange of the plurality of connecting members extends perpendicular to the transverse wall of the connecting member.

9. The wall forming kit of claim 1 wherein each flange of the plurality of connecting members extends perpendicular to the first sidewall and second sidewall of the connecting member.

10. The wall forming kit of claim 1 wherein each flange of the plurality of connecting members is formed of a first clip portion and a second clip portion that are biased towards one another so as to frictionally engage the sidewall of another connecting member or support member.

11. The wall forming kit of claim 1 further comprising a plurality of panels, wherein each panel has a first sheet and a second sheet in parallel spaced relation separated by a support sheet positioned there between.

12. The wall forming kit of claim 1 further comprising the transverse wall of at least one connecting member having an extension that extends past the end of the first sidewall and the end of the second sidewall and having a centrally located opening that overlaps with an opening in the transverse wall of at least one support member, wherein the opening in the extension of the connecting member and the opening in the transverse wall of the support member receive an axel such that the connecting member is angularly adjustable along the same horizontal plane as the extension of the connecting member and transverse wall of the connecting member.

13. A wall forming kit for modeling office space, the kit comprising:
   a plurality of support members wherein each support member has a U-shaped body that extends a length between opposing ends, the U-shaped body including a first sidewall and a second sidewall in parallel spaced relation separated by a transverse wall, the U-shaped body having a plurality of openings therein, wherein the ends of the U-shaped body are open;
   a plurality of connecting members wherein each connecting member has a U-shaped body that extends a length between opposing ends, the U-shaped body including a first sidewall and a second sidewall in parallel spaced relation separated by a transverse wall, the U-shaped body having a plurality of openings therein;
   the plurality of connecting members wherein each connecting member has a flange positioned adjacent one end of the U-shaped body or a first flange positioned at one end of the U-shaped body and a second flange positioned at the other end of the U-shaped body, wherein the at least one flange is sized and shaped to fit over and frictionally engage and hold the sidewall of one of the support members or another connecting member;
   a plurality of perpendicular supports wherein each perpendicular support has a center transverse wall connected to a pair of elongated supports that extend in parallel spaced relation to one another, terminate in a point opposite the center transverse wall, and have a plurality of openings;
   a plurality of wall cleats wherein each wall cleat has a flat top wall having an opening, a downwardly extending wall connected to one end of the flat top wall, a bottom wall connected to the end of the downwardly extending wall opposite the flat top wall and extending in parallel spaced alignment with the flat top wall, an engagement member that extends upwardly connected to one end of the bottom wall opposite the downwardly extending wall, and an insertion member connected to the engagement member and the flat top wall;
   wherein the kit is used to model office space.

14. The wall forming kit of claim 13 wherein when the insertion member is inserted into a surface of a vertically standing panel the engagement member engages and extends parallel to the surface of the vertical standing panel such that the wall cleat supports a perpendicular panel connected through the opening in the top wall of the wall cleat.

15. A wall forming kit for modeling office space, the kit comprising:
   a plurality of support members wherein each support member has a U-shaped body that extends a length between opposing ends, the U-shaped body including a first sidewall and a second sidewall in parallel spaced relation separated by a transverse wall, the U-shaped body having a plurality of openings therein, wherein the ends of the U-shaped body are open;
   a plurality of connecting members wherein each connecting member has a U-shaped body that extends a length between opposing ends, the U-shaped body including a first sidewall and a second sidewall in parallel spaced relation separated by a transverse wall, the U-shaped body having a plurality of openings therein;
   the plurality of connecting members wherein each connecting member has a tab extending outward from one or both ends of the transverse wall beyond the first sidewall and the second sidewall and in parallel alignment in the same plane as the transverse Wall, wherein the tab has a rounded exterior edge and an opening therein;
   a plurality of perpendicular supports wherein each perpendicular support has a center transverse wall connected to a pair of elongated supports, wherein the elongated supports extend in parallel spaced relation to one another, terminate in a point opposite the center transverse wall, and have a plurality of openings;
   a plurality of wall cleats wherein each wall cleat has a flat top wall and a pointed engagement member;
   wherein the kit is used to model office space.

16. The wall forming kit of claim 15 further comprising a plurality of fasteners, wherein each fastener is sized and shaped to pass through the plurality of openings in the plurality of support members and the plurality of connecting members.

17. The wall forming kit of claim 15 wherein when the tab of a first connecting member is positioned in overlapping condition with the tab of a second connecting member and a fastener is passed through the openings in the overlapping tabs, the two connecting members angularly pivot in relation to one another on the fastener.

18. The wall forming kit of claim 15 further comprising a knife.

19. The wall forming kit of claim 15 further comprising a plurality of panels, wherein each panel is formed of cardboard.

* * * * *

UNITED STATES PATENT AND TRADEMARK OFFICE
CERTIFICATE OF CORRECTION

| | | |
|---|---|---|
| PATENT NO. | : 9,121,173 B2 | Page 1 of 1 |
| APPLICATION NO. | : 13/572807 | |
| DATED | : September 1, 2015 | |
| INVENTOR(S) | : Harold C. Hudson | |

It is certified that error appears in the above-identified patent and that said Letters Patent is hereby corrected as shown below:

In the Claims

Col. 6, Claim 2, Line 50:
DELETE after each "fasteners"
ADD after each --fastener-- (Second Occurrence)

Col. 6, Claim 3, Line 55:
DELETE after each "panels"
ADD after each --panel-- (Second Occurrence)

Col. 8, Claim 13, Lines 6-7:
DELETE after the "engagement member and the"

Signed and Sealed this
Sixteenth Day of February, 2016

Michelle K. Lee
*Director of the United States Patent and Trademark Office*